(12) United States Patent
Ushiyama et al.

(10) Patent No.: US 12,448,232 B2
(45) Date of Patent: Oct. 21, 2025

(54) ARRANGEMENT POSITION DETERMINATION METHOD OF OBJECT, CONTROL DEVICE, NON-TRANSITORY COMPUTER-READABLE STORAGE MEDIUM, CARGO HANDLING DEVICE, AND CARGO HANDLING SYSTEM

(71) Applicant: KABUSHIKI KAISHA TOSHIBA, Tokyo (JP)

(72) Inventors: Takafumi Ushiyama, Sagamihara (JP); Osamu Maruyama, Yokohama (JP); Haruhiko Horiuchi, Yokohama (JP); Yoshihide Otsuru, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 933 days.

(21) Appl. No.: 17/455,073

(22) Filed: Nov. 16, 2021

(65) Prior Publication Data

US 2022/0153541 A1     May 19, 2022

(30) Foreign Application Priority Data

Nov. 18, 2020 (JP) ................................ 2020-192056

(51) Int. Cl.
*B65G 1/00*     (2006.01)
*B65G 47/90*    (2006.01)
(Continued)

(52) U.S. Cl.
CPC ............ *B65G 61/00* (2013.01); *B65G 47/90* (2013.01); *B65G 57/03* (2013.01); *B65G 57/22* (2013.01);
(Continued)

(58) Field of Classification Search
CPC ........ B65G 61/00; B65G 47/90; B65G 57/03; B65G 57/22; B65G 67/02; B65G 67/20;
(Continued)

(56) References Cited

U.S. PATENT DOCUMENTS

| | | | |
|---|---|---|---|
| 4,692,876 A | * | 9/1987 | Tenma .................... G06Q 10/08 901/7 |
| 5,794,416 A | * | 8/1998 | Rahman ................. B65G 61/00 53/157 |

(Continued)

FOREIGN PATENT DOCUMENTS

| | | |
|---|---|---|
| EP | 2 923 976 A1 | 9/2015 |
| JP | 8-40567 A | 2/1996 |

(Continued)

OTHER PUBLICATIONS

Japanese Office Action issued May 28, 2024 in Japanese Application 2020-192056, (with unedited computer-generated English translation), 8 pages.

*Primary Examiner* — Thomas Randazzo
(74) *Attorney, Agent, or Firm* — Oblon, McClelland, Maier & Neustadt, L.L.P.

(57) ABSTRACT

An arrangement position determination method of an object, including: based on information of dimensions of a predetermined area and dimensions of a plurality of objects to be accommodated in the predetermined area stored in a storage section of a control device, searching for a position at which the object does not interfere with a boundary of the predetermined area and other objects in a first direction; and when there is no position at which the object does not interfere with the boundary and the other objects in the first direction, searching for a position at which the object does not interfere with the boundary and the other objects in the first direction at a position shifted in a second direction orthogonal to the first direction.

20 Claims, 11 Drawing Sheets

(51) Int. Cl.
B65G 57/03 (2006.01)
B65G 57/22 (2006.01)
B65G 61/00 (2006.01)
B65G 67/02 (2006.01)
B65G 67/20 (2006.01)
G06Q 10/08 (2023.01)

(52) U.S. Cl.
CPC ............. B65G 67/02 (2013.01); B65G 67/20 (2013.01); G06Q 10/08 (2013.01)

(58) Field of Classification Search
CPC .... B65G 2203/0208; B65G 2203/0216; B65G 2203/041; G06Q 10/08
See application file for complete search history.

(56) References Cited

U.S. PATENT DOCUMENTS

| | | |
|---|---|---|
| 6,315,513 B1 | 11/2001 | Harukawa et al. |
| 10,647,528 B1 | 5/2020 | Diankov et al. |
| 2004/0265097 A1 | 12/2004 | Kim et al. |
| 2014/0199142 A1 | 7/2014 | Criswell |
| 2016/0054923 A1* | 2/2016 | Ishida ................... G06F 3/0673 711/165 |
| 2016/0068357 A1 | 3/2016 | Bastian, II |
| 2017/0146341 A1* | 5/2017 | Kimoto ................... G01B 21/00 |
| 2017/0267467 A1* | 9/2017 | Kimoto ............ G05B 19/41865 |
| 2018/0086572 A1 | 3/2018 | Kimoto et al. |
| 2019/0279426 A1* | 9/2019 | Musunuri .............. G06V 20/20 |
| 2020/0055553 A1* | 2/2020 | Raasch ................... G01S 15/08 |
| 2020/0078941 A1 | 3/2020 | Oka et al. |
| 2021/0110122 A1* | 4/2021 | Volkerink .......... G06Q 10/0832 |
| 2021/0319582 A1* | 10/2021 | Sangeneni ................ G06T 7/62 |
| 2022/0051176 A1* | 2/2022 | Yamaguchi ........ G06Q 10/0832 |
| 2022/0129832 A1* | 4/2022 | Gil ....................... B65G 47/902 |
| 2023/0062204 A1* | 3/2023 | Tomiyama ........... G06Q 10/087 |
| 2024/0037751 A1* | 2/2024 | Wang ................... H04N 13/271 |

FOREIGN PATENT DOCUMENTS

| | | |
|---|---|---|
| JP | 2000-238906 A | 9/2000 |
| JP | 2005-008409 A | 1/2005 |
| JP | 2018-52691 A | 4/2018 |
| JP | 2020-40158 A | 3/2020 |
| JP | 6684404 B1 | 4/2020 |

* cited by examiner

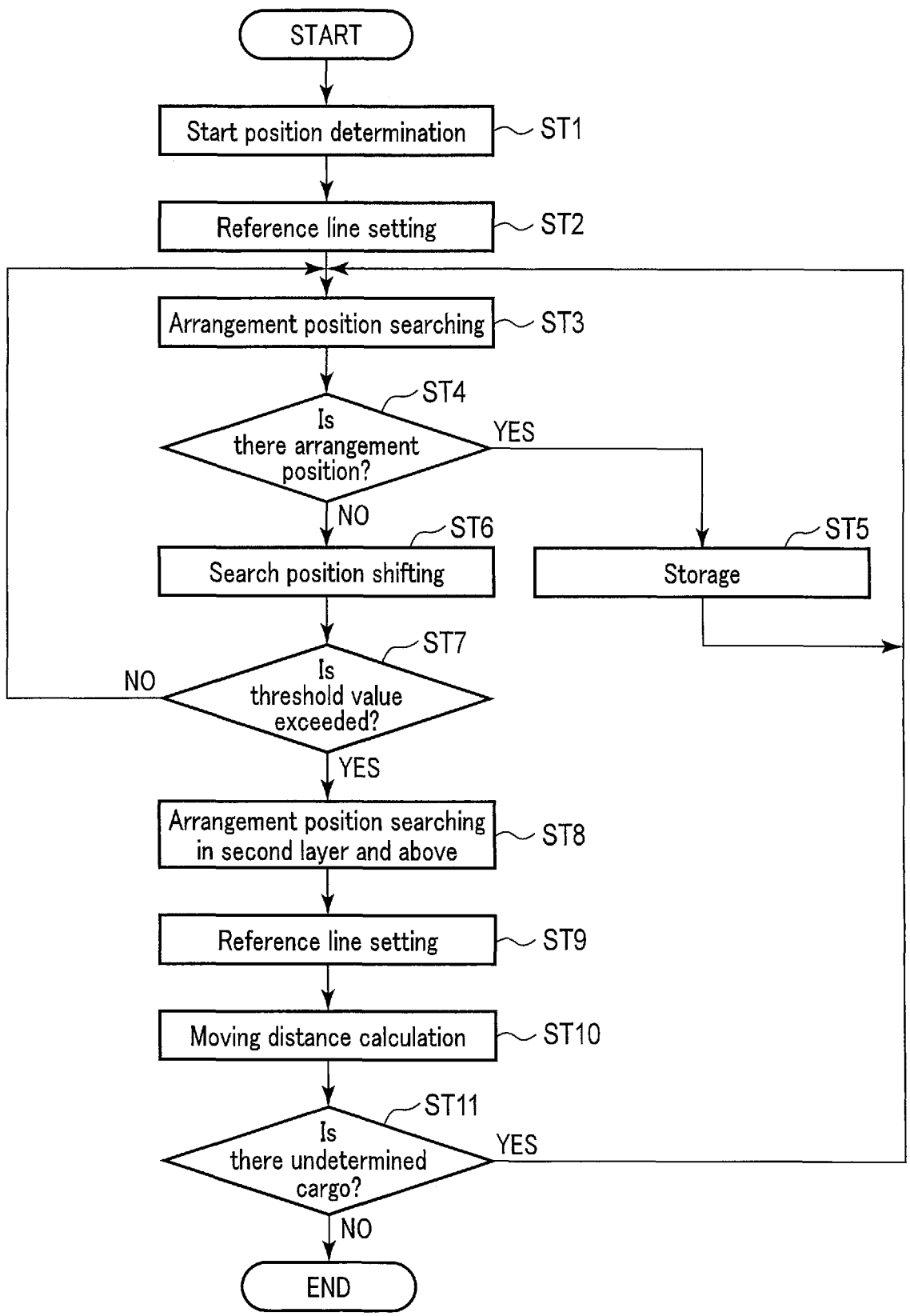
F I G. 7

ARRANGEMENT POSITION DETERMINATION METHOD OF OBJECT, CONTROL DEVICE, NON-TRANSITORY COMPUTER-READABLE STORAGE MEDIUM, CARGO HANDLING DEVICE, AND CARGO HANDLING SYSTEM

CROSS-REFERENCE TO RELATED APPLICATION

This application is based upon and claims the benefit of priority from Japanese Patent Application No. 2020-192056, filed Nov. 18, 2020; the entire contents of which are incorporated herein by reference.

FIELD

Embodiments described herein relate generally to an arrangement position determination method of an object, a control device, a non-transitory computer-readable storage medium, a cargo handling device, and a cargo handling system.

BACKGROUND

Conventionally, a cargo handling device such as a conveyor has been used for loading and unloading an object onto and from a container, etc. A conveyor is installed inside and outside a container when performing a cargo handling task. A worker manually loads into the container an object conveyed into the container by the conveyor from outside the container.

It has been known that an object arrangement method necessary for automating a cargo handling task of a rectangular object by a robot is determined by calculation.

BRIEF DESCRIPTION OF THE DRAWINGS

FIG. 7 is a flowchart showing an example of a determination method of an arrangement position of the object by the control device.

DETAILED DESCRIPTION

According to one embodiment, An arrangement position determination method of an object, including: based on information of dimensions of a predetermined area and dimensions of a plurality of objects to be accommodated in the predetermined area stored in a storage section of a control device, searching for a position at which the object does not interfere with a boundary of the predetermined area and other objects in a first direction; and when there is no position at which the object does not interfere with the boundary and the other objects in the first direction, searching for a position at which the object does not interfere with the boundary and the other objects in the first direction at a position shifted in a second direction orthogonal to the first direction.

Figure 1:
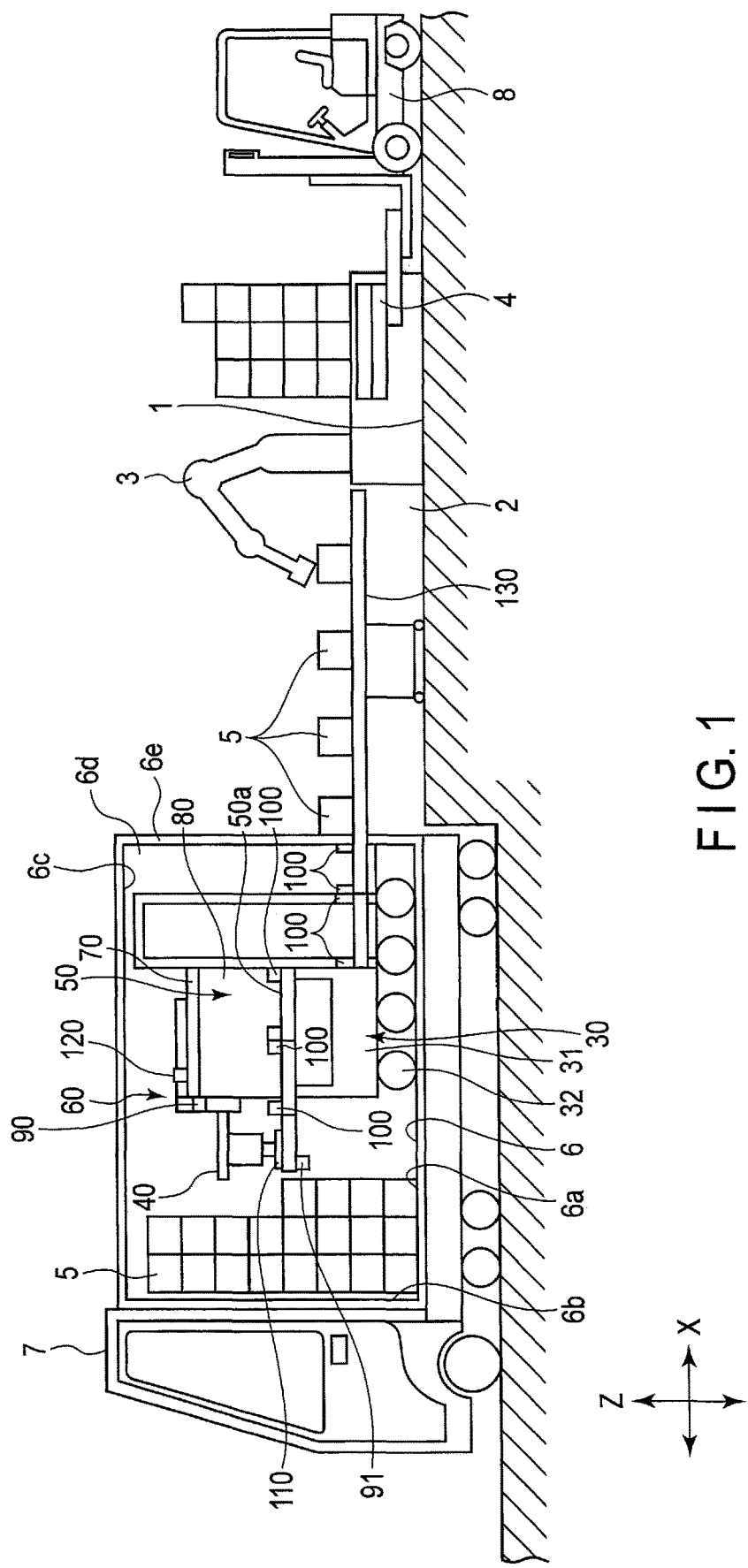
FIG. 1 is a side view showing a configuration of a cargo handling device according to a first embodiment.
Figure 2:
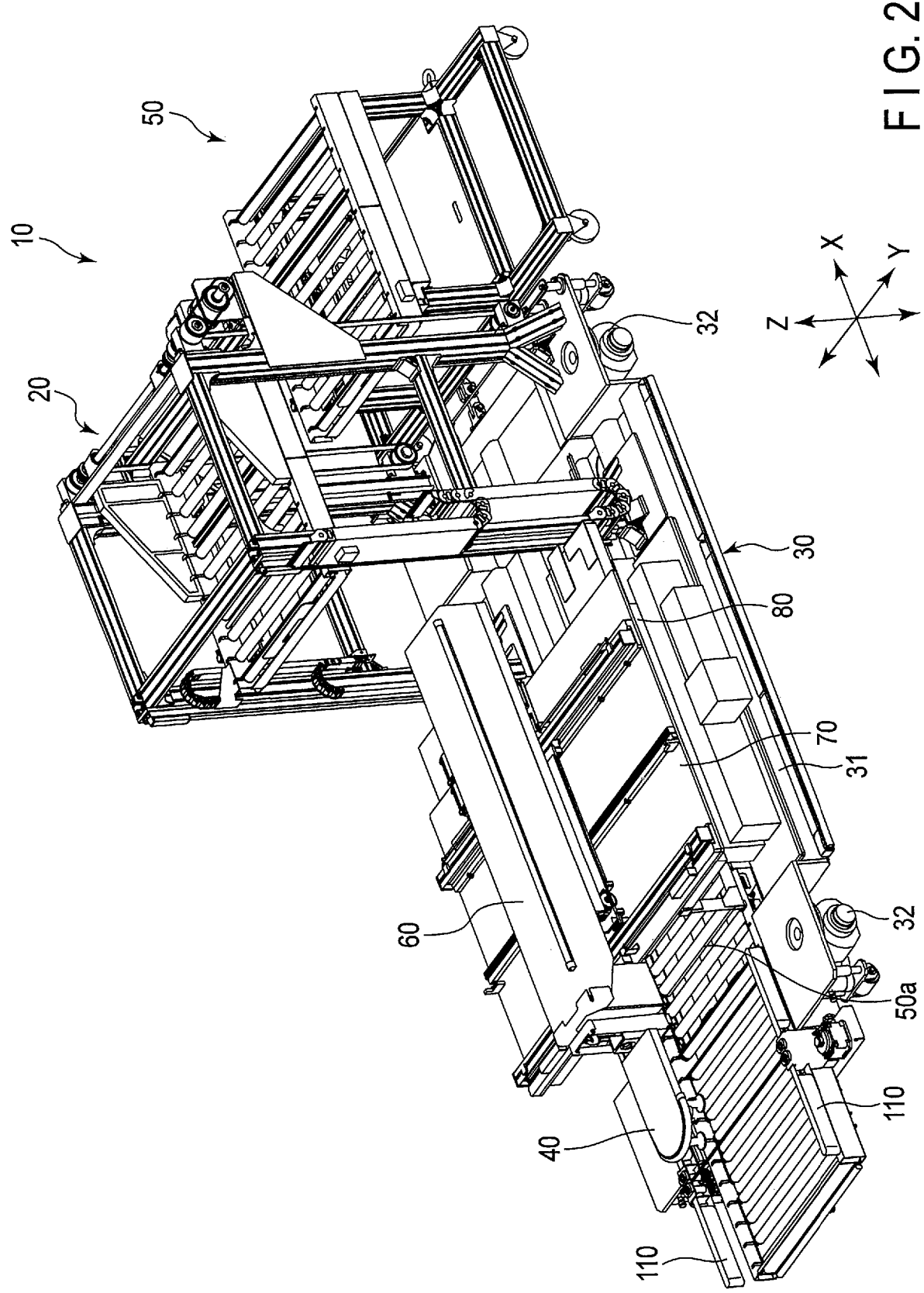
FIG. 2 is a perspective view showing a configuration of the cargo handling device.
Figure 3:
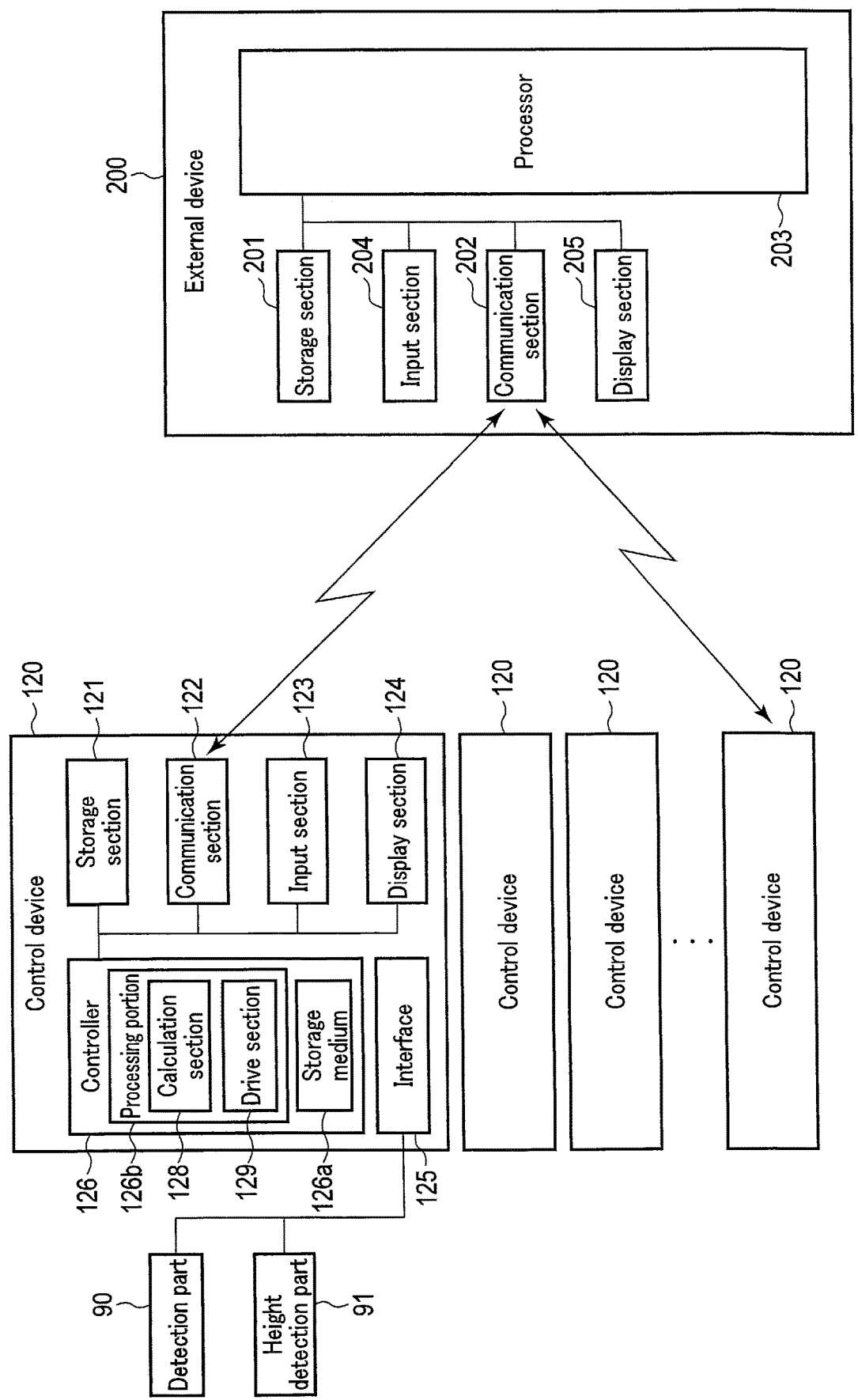
FIG. 3 is an explanatory diagram showing a cargo handling system including a control device of the cargo handling device and an external device.
Figure 4:
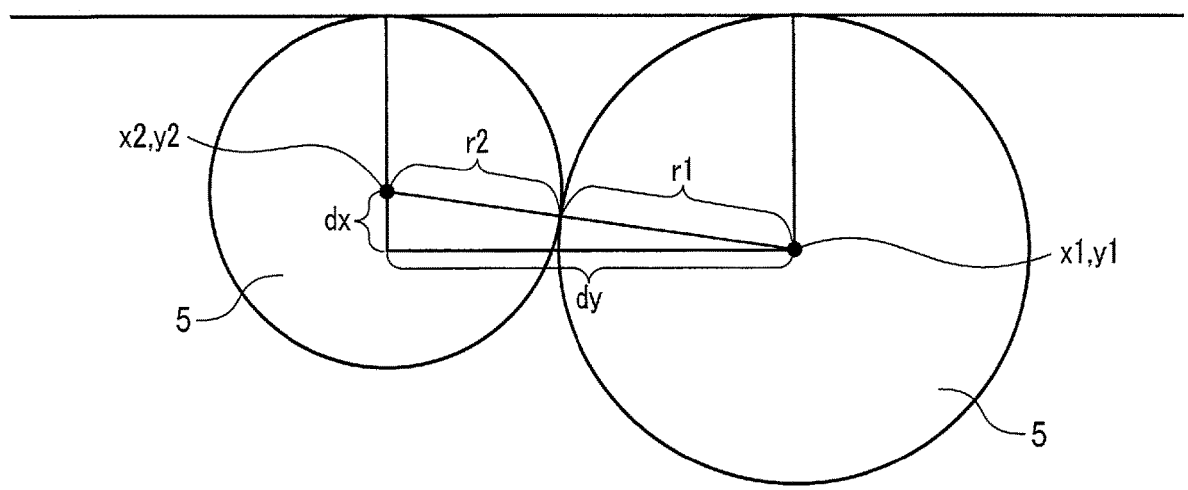
FIG. 4 is a diagram explaining an example of searching for an arrangement position of an object by the control device.
Figure 5:
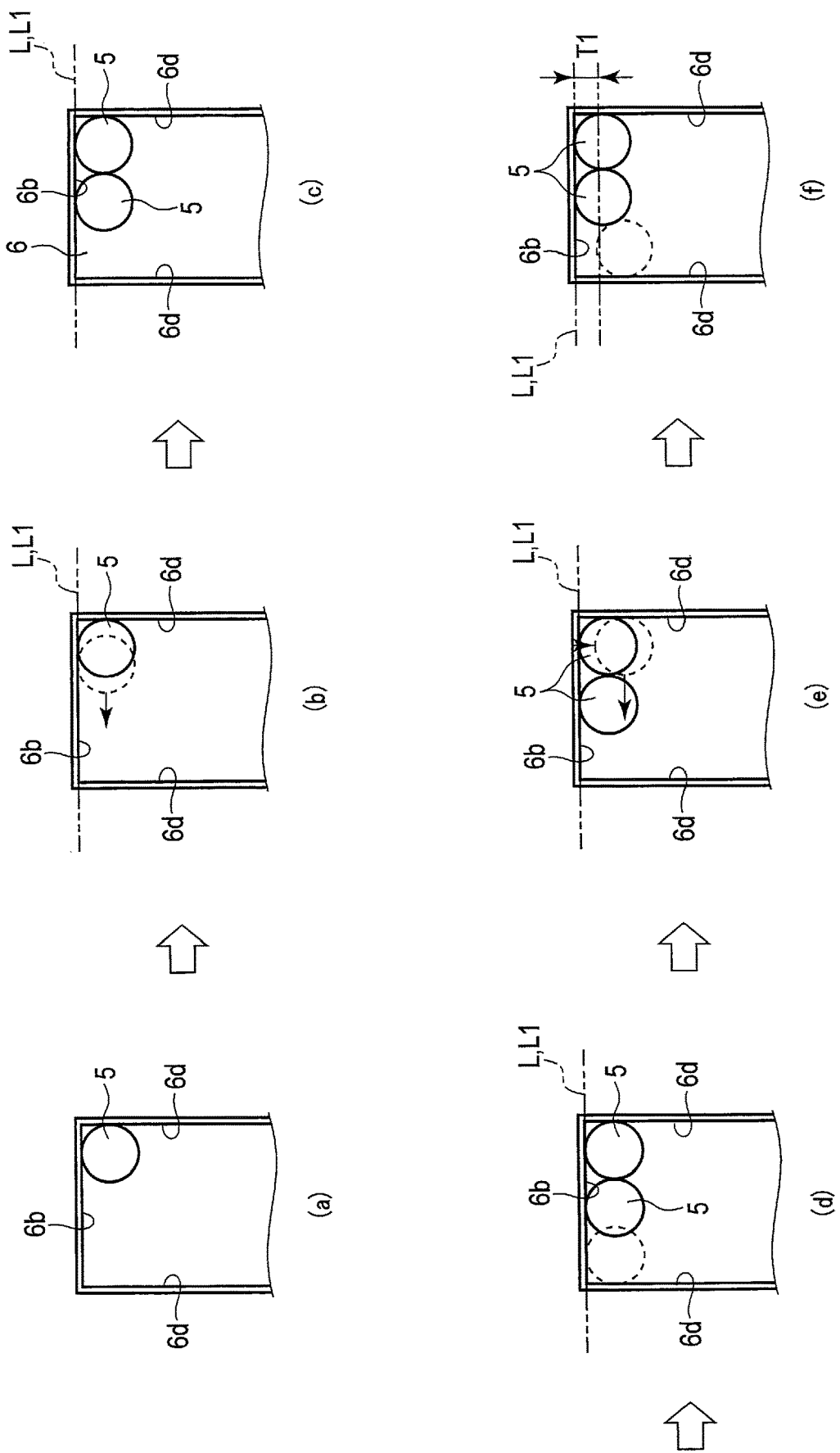
FIG. 5 is a diagram explaining an example of searching for an arrangement position of the object by the control device.
Figure 6:
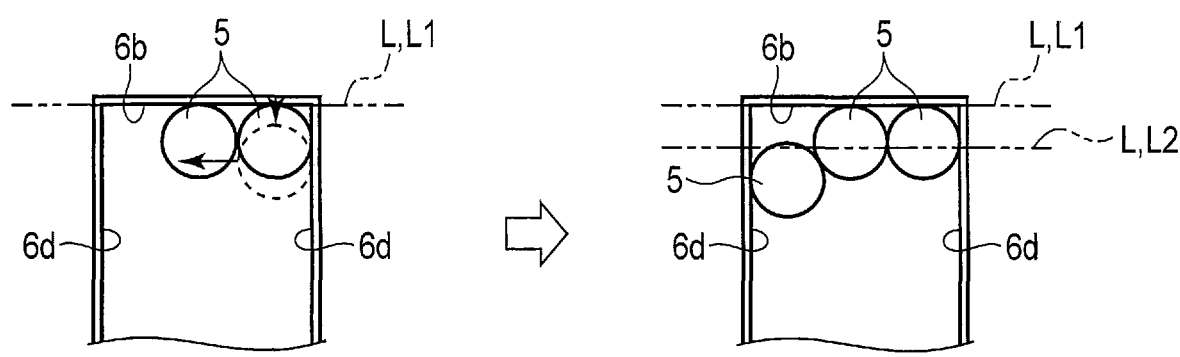
FIG. 6 is a diagram explaining an example of setting of a reference line by the control device.
Figure 8:
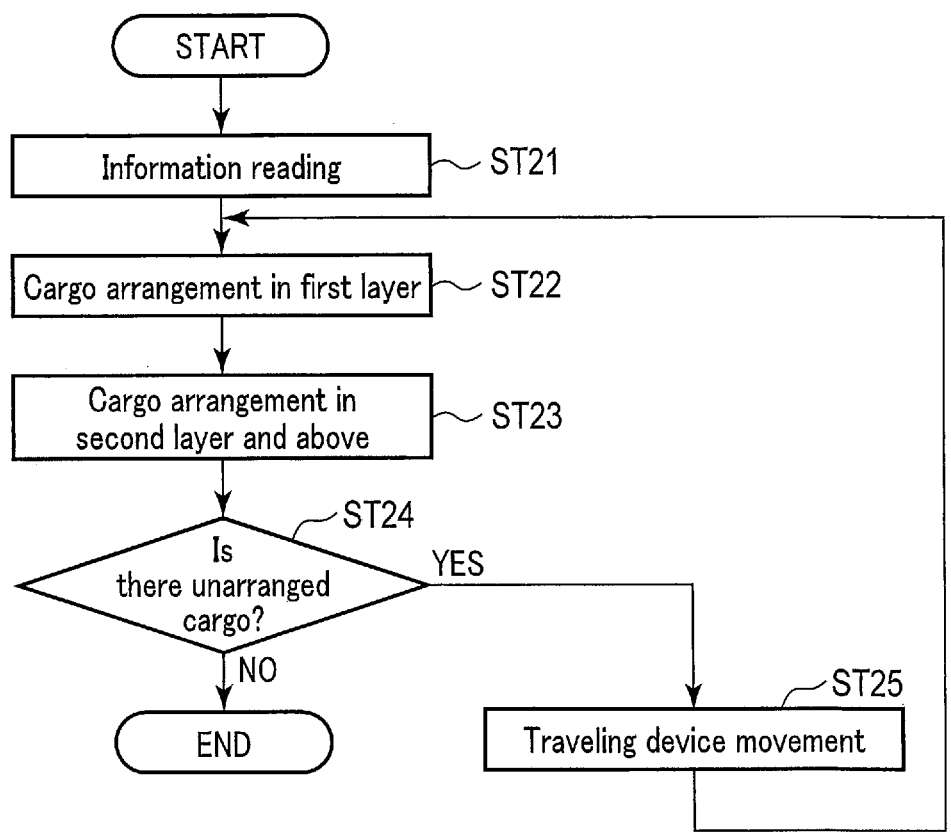
FIG. 8 is a flowchart showing an example of an operation of arranging the object in an accommodating portion by the cargo handling device.
Figure 9:
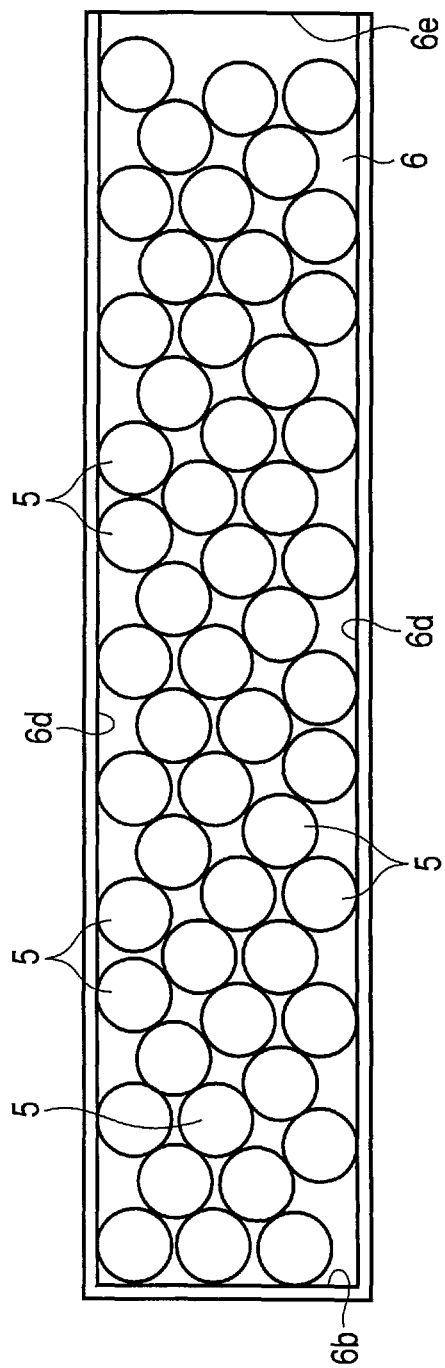
FIG. 9 is a diagram explaining an arrangement position of the object.

A cargo handling device 10 according to an embodiment will be described with reference to FIGS. 1 to 9. FIG. 1 is a side view showing a configuration of the cargo handling device 10. FIG. 2 is a perspective view showing a configuration of the cargo handling device 10. FIG. 3 is an explanatory diagram showing a cargo handling system including a control device 120 and an external device 200 of the cargo handling device 10. FIG. 4 is a diagram explaining an example of searching for an arrangement position of a piece of cargo 5 by the control device 120. FIG. 5 is a diagram explaining an example of searching for an arrangement position of the piece of cargo 5 by the control device 120. FIG. 6 is a diagram explaining an example of setting of a reference line L by the control device 120. FIG. 7 is a flowchart showing an example of a determination method of an arrangement position of the piece of cargo 5 by the control device 120. FIG. 8 is a flowchart showing an example of an operation of arranging the piece of cargo 5 in an accommodating portion 6 by the cargo handling device 10. FIG. 9 is a diagram explaining an arrangement position of the piece of cargo 5.

As shown in FIG. 1, the cargo handling device 10 includes a device main body 20 and the control device 120.

The cargo handling device 10 arranges a piece of cargo 5 conveyed by an external conveying part 130 at a target position within the accommodating portion 6 by the device main body 20. The target position is an arrangement position of the piece of cargo 5 that is planned by the control device 120. In this way, the cargo handling device 10 performs loading as an example of cargo handling.

In addition, the cargo handling device 10 moves the piece of cargo 5 within the accommodating portion 6 to the external conveying part 130 by the device main body 20. Then, the piece of cargo 5 is conveyed by the external conveying part 130 to a target position such as a collection place, etc. of the piece of cargo 5. As such, the cargo handling device 10 performs unloading as an example of cargo handling. In addition, the cargo handling device 10 can also move the piece of cargo 5 conveyed by the external conveying part 130 to a device such as another conveyor. The target position as a conveying destination by the cargo handling device 10 can be appropriately set.

The cargo handling device 10 is, for example, used in a shipping berth 1. At a collection place 2, etc. of the shipping berth 1, cargo handling of the piece of cargo 5 is performed for the external conveying part 130. For cargo handling for the external conveying part 130, for example, a robot arm 3 is used. By this robot arm 3, for example, the piece of cargo 5 is moved between the external conveying part 130 and a pallet 4. The pallet 4 is, for example, conveyed by a forklift 8. The pallet 4 is loaded with a plurality of pieces of cargo 5.

The piece of cargo 5 is an example of an object to be handled by the cargo handling device 10. The piece of cargo 5 is, for example, in a shape other than a rectangular parallelepiped, and is a cylindrical object as a specific example. The piece of cargo 5 is a tire in the example of the present embodiment.

The accommodating portion 6 is capable of accommodating the piece of cargo 5, and is a container to be conveyed by a truck 7 in the example of the present embodiment. However, the accommodating portion 6 is not limited to a container. The accommodating portion 6 may be, for example, a truck bed or a storage space for the piece of cargo 5 provided in a section of a factory. Alternatively, the accommodating portion 6 may be an arrangement area provided on a plane on which the piece of cargo 5 can be arranged, such as a floor. Accommodation in the accommodating portion 6 includes arranging the piece of cargo 5 in an arrangement space, a storage space, an arrangement area, etc.

The accommodating portion 6 has, for example, a floor surface 6a, a front surface 6b, a ceiling surface 6c, a pair of side surfaces 6d, and an opening portion 6e. The floor surface 6a is, for example, formed in a rectangular shape long in one direction. In another configuration example of the accommodating portion 6, the accommodating portion 6 may have a configuration having the floor surface 6a, the front surface 6b, the two side surfaces 6d, and no ceiling surface 6c.

The external conveying part 130 is, for example, formed so as to convey an object between a collection place of the piece of cargo 5 outside the accommodating portion 6 and a conveying part 50. The external conveying part 130 is, for example, a conveyor which can be expanded and contracted in a conveyance direction.

Herein, an example of a direction will be defined. An approximately horizontal direction includes a horizontal direction and a direction that is slightly inclined with respect to the horizontal direction. Further, an approximately vertical direction includes a vertical direction intersecting the horizontal direction and a direction that is slightly inclined with respect to the vertical direction.

A front-back direction and a width direction of the accommodating portion 6 will be defined. The front-back direction of the accommodating portion 6 is set such that a direction from the opening portion 6e toward the front surface 6b is a front direction, and a reverse direction thereof is a back direction. The width direction is a direction from one side surface 6d toward the other side surface 6d, and vice versa. In a state where the accommodating portion 6 is, for example, arranged in a horizontal plane, the front-back direction and the horizontal direction of the accommodating portion 6 are approximately horizontal directions.

As shown in FIGS. 1 and 2, the device main body 20 is formed so as to arrange the piece of cargo 5 conveyed from the external conveying part 130 at a target position of the accommodating portion 6, and convey the piece of cargo 5 in the accommodating portion 6 to the external conveying part 130. Arranging at a target position of the accommodating portion 6 includes stacking a piece of cargo 5 flat on the floor surface 6a of the accommodating portion 6, and further stacking one or more pieces of cargo 5 on the piece of cargo 5 arranged flat on the floor surface 6a.

The device main body 20 includes, for example, a traveling device 30, a holding part 40, a conveying part 50, a holding part moving device 60, a supporting part 70, a supporting part moving device 80, a detection part 90, a height detection part 91, a cargo detection part 100, and a positioning device 110. The device main body 20 is moved by the traveling device 30, holds a piece of cargo 5 by the holding part 40, and moves the piece of cargo 5 by moving the holding part 40 by the holding part moving device 60 and the supporting part moving device 80.

Herein, the device main body 20 is set with a first direction X, a second direction Y, and a third direction Z. The first direction X, the second direction Y, and the third direction Z respectively are uniaxial directions orthogonal to each other. When the cargo handling device 10 is placed on a horizontal plane orthogonal to the vertical direction, the first direction X and the second direction Y are parallel with the approximately horizontal direction, and the third direction Z is parallel with the approximately vertical direction. The uniaxial direction referred to here includes one direction and a direction opposite to this one direction.

The traveling device 30 is formed so as to move the device main body 20 from the outside of the accommodating portion 6 to the inside of the accommodating portion 6, and from the inside of the accommodating portion 6 to the outside of the accommodating portion 6. The traveling device 30 includes, for example, a traveling device base part 31 and a traveling part 32 provided in the traveling device base part 31.

The holding part 40 is formed so as to detachably hold a piece of cargo 5.

The conveying part 50 includes a conveying surface 50a. The conveying part 50 is formed so as to convey the piece of cargo 5 placed on the conveying surface 50a between the external conveying part 130 and the holding part 40.

The holding part moving device 60 is an example of a device which moves the piece of cargo 5 in one direction and another direction orthogonal to this one direction. In the example of the present embodiment, the holding part moving device 60 moves the holding part 40, for example, in the first direction X, the second direction Y, and the third direction Z. The holding part moving device 60 is supported on, for example, a top surface of the supporting part 70.

The supporting part 70 is supported by the supporting part moving device 80 above the conveying part 50.

The supporting part moving device 80 supports the supporting part 70 at the traveling device base part 31. The supporting part moving device 80 supports the supporting part 70 so as to be movable in the third direction Z relative to the traveling device base part 31.

The detection part 90 is formed so as to detect an inner portion of the accommodating portion 6. The detection part 90 is, for example, formed so as to detect a piece of cargo 5 on the floor surface 6a. The detection part 90 is, for example, a camera. The detection part 90 transmits captured information to the control device 120.

The height detection part 91 detects a height of a piece of cargo 5 arranged in the accommodating portion 6. The height detection part 91 is, for example, a sensor. The height detection part 91 is, for example, provided at a lower end of one end in the first direction X of the conveying part 50.

The cargo detection part 100 is formed so as to detect a piece of cargo 5 on the conveying surface 50a. For example, the cargo detection part 100 is a sensor which is provided at a plurality of positions along the conveying part 50 and detects a piece of cargo 5 on the conveying surface 50a. The cargo detection part 100 transmits a detection result to the control device 120.

The positioning device 110 is, for example, provided at one end portion in the first direction X of the conveying part 50. The positioning device 110 positions a piece of cargo 5 conveyed to one end portion in the first direction X of the conveying surface 50*a* at a predetermined position.

The control device 120 controls the traveling device 30, the holding part 40, the conveying part 50, the holding part moving device 60, the supporting part moving device 80, and the positioning device 110. In addition, the control device 120 determines an arrangement position at which a piece of cargo 5 is arranged within the accommodating portion 6. The control device 120 is, for example, a control basis, a control box including a control basis, a processing terminal, etc. The processing terminal is, for example, a personal computer. The control device 120 is, for example, fixed to the supporting part 70 of the device main body 20.

As shown in FIG. 3, the control device 120 constitutes a cargo handling system with the external device 200. The external device 200 is a device which communicates with the control device 120. The external device 200 is a management device which manages a plurality of cargo handling devices 10 in the example of the present embodiment.

The external device 200 is, for example, a processing terminal such as a personal computer. The external device 200 includes, for example, a storage section 201, a communication section 202, an input section 204, a display section 205, and a processor 203. The external device 200 can communicate with each of a plurality of control devices 120 by the communication section 202.

The storage section 201, for example, stores information of dimensions of the accommodating portion 6, dimension information of a piece of cargo 5, information of the order of pieces of cargo 5 to be sent to the device main body 20, etc. In addition, the storage section 201 stores information of an arrangement position of a piece of cargo 5 that is received from the control device 120. Further, the storage section 201 stores a program that the processor 203 executes, etc. The communication section 202 communicates with the control devices 120 of the plurality of cargo handling devices 10.

The input section 204 is operated when a worker inputs data, etc. The input section 204 is, for example, a keyboard.

The display section 205 displays, for example, the program and information stored in the storage section 201, data that the worker inputs by the input section 204, etc.

The processor 203 performs, for example, various controls by executing the program stored in the storage section 201.

The control device 120 includes, for example, a storage section 121, a communication section 122, an input section 123, a display section 124, an interface 125, and a controller 126.

The storage section 121 is a storage medium such as a memory. The storage section 121 is an example of a non-transitory computer-readable storage medium. The storage section 121 stores a program, etc. that the controller 126 executes. In addition, the storage section 121 stores information of dimensions of the accommodating portion 6, information of dimensions of a plurality of pieces of cargo 5 accommodated in the accommodating portion 6, and information of the order of the plurality of pieces of cargo 5 to be sent to the device main body 20.

The storage section 121 also stores an arrangement position of the piece of cargo 5 that the controller 126 determines. The storage section 121 also stores information used for searching for an arrangement position of the piece of cargo 5. This information includes, for example, a distance T and a threshold value TH.

The distance T is a distance by which a position in the front-back direction to be searched for an arrangement position of the piece of cargo 5 is shifted backward from a previous position. The distance T is smaller than a dimension in the front-back direction of the piece of cargo 5 arranged in the accommodating portion 6, i.e., a diameter of the piece of cargo 5 in the example of the present embodiment. For example, the distance T is preferably a small amount. The term "small" as used herein means an amount that makes a gap generated between a piece of cargo 5 to be searched for and a piece of cargo 5 whose arrangement position is determined sufficiently small before and after the shift. The threshold value TH is the maximum moving distance in the first direction X of the holding part 40 by the holding part moving device 60.

The communication section 122 communicates with the external device 200. The communication section 122 is, for example, connected to the external device 200 via an external network such as the Internet or an internal network such as a LAN (Local Area Network).

The input section 123 is, for example, a keyboard, etc. The input section 123 is, for example, used for input of information to be stored in the storage section 121, etc.

The display section 124 is, for example, a display. The display section 124 displays, for example, information stored in the storage section 121, a display when an operator operates the input section 123, information that a worker inputs, etc.

The interface 125 is connected to the device main body 20. The detection part 90 and the height detection part 91 are connected to the interface 125 in the example of the present embodiment.

The controller 126 is a computer. The controller 126 is, for example, a processor. The controller 126 is, for example, a central processing unit (CPU), an application specific integrated circuit (ASIC), or a field programmable gate array (FPGA). The controller 126 controls the device main body 20 based on information stored in the storage section 121, and detection results of the detection part 90, the height detection part 91, and the cargo detection part 100. The controller 126 includes a storage medium 126*a* and a processing portion 126*b*.

The storage medium 126*a* is, for example, a register which stores a program that the controller 126 executes, etc. In the example of the present embodiment, a program that the controller 126 executes may be stored in at least one of the storage medium 126*a* and the storage section 121. The storage medium 126*a* is an example of a non-transitory computer-readable storage medium.

The processing portion 126*b* includes a calculation section 128 and a drive section 129. The processing portion 126*b*, for example, functions as the calculation section 128 and the drive section 129 by executing a program stored in at least one of the storage section 121 and the storage medium 126*a*.

The calculation section 128 performs searching for an arrangement position of a piece of cargo 5 based on dimension information of the accommodating portion 6, dimension information of the piece of cargo 5, the distance T, the threshold value TH, etc. stored in at least one of the storage section 121 and the storage medium 126*a*. Herein, to search for an arrangement position of a piece of cargo 5 means to search for a position at which the piece of cargo 5 can be arranged based on the dimensions of the accommodating portion 6 and the dimensions of the piece of cargo 5.

Herein, to search for an arrangement position of a piece of cargo 5 means to find a position at which the piece of cargo 5 does not interfere with a boundary of the accommodating portion 6 and other pieces of cargo 5. Not to interfere with a boundary of the accommodating portion 6 and another piece of cargo 5 means that an arrangement area of the piece of cargo 5 does not overlap the side surface 6d, which is a boundary of the accommodating portion 6, and arrangement areas of other pieces of cargo 5, and includes the piece of cargo 5 being in contact with the side surface 6d, which is a boundary of the accommodating portion 6, and outer surfaces of other pieces of cargo 5.

The calculation section 128, for example, searches in the width direction for a position at which a distance between the side surface 6d and a center of a piece of cargo 5 to be searched for is equal to or larger than a radius of the piece of cargo 5 to be searched for, and a distance between the center of the piece of cargo 5 to be searched for and a center of another piece of cargo 5 whose arrangement position has already been determined is equal to or larger than a sum of radii of these two pieces of cargo 5. When searching in the width direction, a position of a front end of the piece of cargo 5 to be searched for is arranged at a certain position in the front-back direction. In other words, a position of a front end of the piece of cargo 5 whose arrangement position has already been determined and the position of the front end of the piece of cargo 5 to be searched for are the same in the front-back direction.

An example of searching is a method for determining an arrangement position of a piece of cargo 5 to be searched for based on dimensions of the piece of cargo 5 to be searched for and dimensions of a piece of cargo 5 whose arrangement position has already been determined. Specifically, the calculation section 128 first determines a search start position. The search start position is a position to start searching for a piece of cargo 5 in the width direction, and is at least a position at which a position of a front end of a piece of cargo 5 to be searched for becomes a predetermined position in the front-back direction. In the example of the present embodiment, the search start position is a position at which a front end of a piece of cargo 5 to be searched for becomes a predetermined position, and further the piece of cargo 5 to be searched for abuts on one side surface 6d.

Then, in a case where the piece of cargo 5 is arranged at the search start position and the piece of cargo 5 does not interfere with a boundary of the accommodating portion 6, the calculation section 128 determines the search start position as an arrangement position of the piece of cargo 5. Then, the calculation section 128 optimizes the search start position. The optimization is performed based on dimensions of a piece of cargo 5 to be searched for and dimensions of a piece of cargo 5 whose arrangement position has already been determined.

Hereinafter, an example of searching for an arrangement position of an object by the control device will be described using FIG. 4. Herein, it is assumed that a coordinate of a central position of a piece of cargo 5 whose arrangement position has already been determined is (x1, y1), a radius thereof is r1, and a radius of a piece of cargo 5 to be searched for is r2. x1 is a position in the front-back direction. y1 is a position in the width direction. Herein, one end on the right side of a front end of the floor surface 6a is set as an origin. If a central position of the piece of cargo 5 to be searched for is (x2, y2), y2 of the optimized search start position is $y2 = y1 + \sqrt{(r1+r2)^2 - (r1-r2)^2}$.

In FIG. 4 of the present embodiment, for example, a case is shown in which a radius of a piece of cargo 5 to be searched for is different from that of a piece of cargo 5 whose arrangement position has already been determined. Herein, the radius r2 of the piece of cargo 5 to be searched for is smaller than r1. In addition, in a case where a value of the radius r2 of the piece of cargo 5 to be searched for and the radius r1 of the piece of cargo 5 whose arrangement position has been determined are equal, an optimized search position is $y2 = y1 + 2r1$. As such, the optimized search start position becomes an arrangement position in a case where the piece of cargo 5 does not interfere with the side surface 6d of the accommodating portion 6.

As shown in FIG. 5, another example of searching is a method for determining an arrangement position by shifting in the width direction a piece of cargo 5 to be searched for by a predetermined value at a time from a search start position.

The calculation section 128 first determines a search start position. Then, the calculation section 128 shifts the piece of cargo 5 to be searched for from the search start position by a predetermined distance at a time in the width direction. Then, the calculation section 128 calculates a distance between a boundary of the accommodating portion 6 and the center of the piece of cargo 5 to be searched for each time the piece of cargo 5 is shifted, and calculates a distance between a central position of the piece of cargo 5 to be searched for and a central position of a piece of cargo whose arrangement position has already been determined.

When there are a plurality of pieces of cargo 5 whose arrangement positions have already been determined, the calculation section 128 determines a distance from the center of the piece of cargo 5 to be searched for for each of them. Then, the calculation section 128 determines, as an arrangement position, a position at which a distance between the side surface 6d and the center of the piece of cargo 5 to be searched for is equal to or larger than a radius of the piece of cargo 5 to be searched for, and a distance between the central position of the piece of cargo 5 to be searched for and the central position of the piece of cargo 5 whose arrangement position has already been determined is equal to or larger than a sum of radii of these two pieces of cargo 5.

When this search method is used, information of a predetermined amount to shift the piece of cargo 5 to be searched for in the width direction is stored in the storage section 121. This predetermined amount is preferably a small amount. The term "small" as used herein means an amount that makes a gap generated between the piece of cargo 5 to be searched for and the piece of cargo 5 whose arrangement position is determined sufficiently small before and after the shift.

Explaining the example of searching shown in FIG. 5 specifically, the calculation section 128 first determines a search start position as shown in FIG. 5 (a). In this example, the search start position is a position at which the piece of cargo 5 to be searched for comes into contact with the front surface 6b and one side surface 6d. Next, the calculation section 128 determines the search start position as an arrangement position of a first piece of cargo 5.

Next, as shown in FIG. 5 (b), the calculation section shifts in the width direction a piece of cargo 5 to be searched for next by a predetermined distance at a time from the search start position, and searches for a position at which a distance between the side surface 6d and a center of the piece of cargo 5 to be searched for is equal to or larger than a radius of the piece of cargo 5 to be searched for, and a distance between a center of another piece of cargo 5 whose arrangement position has already been determined and the center of the piece of cargo 5 to be searched for is equal to or larger than a sum of radii of these two pieces of cargo 5.

FIG. 5 (c) shows a state in which a second piece of cargo 5 to be searched for is shifted to a position at which the distance between the side surface 6d and the center of the piece of cargo 5 to be searched for is equal to or greater than the radius of the piece of cargo 5 to be searched for, and the distance between the center of another piece of cargo 5 whose arrangement position has already been determined and the center of the piece of cargo 5 to be searched for is equal to or greater than a sum of radii of these two pieces of cargo 5 by a predetermined distance at a time. The calculation section 128 determines this position as an arrangement position for the second piece of cargo.

Similarly, the calculation section 128 shifts a third piece of cargo 5 by a predetermined distance at a time in the width direction as shown in FIGS. 5 (b) and 5 (c). Then, in a case where there is no position at which a distance between the side surface 6d and a center of the piece of cargo 5 to be searched for is equal to or greater than a radius of the piece of cargo 5 to be searched for, and a distance between a center of another piece of cargo 5 whose arrangement position has already been determined and the center of the piece of cargo 5 to be searched for is equal to or greater than a sum of radii of these two pieces of cargo 5 as shown in FIG. 5 (d), the calculation section 128 shifts the search start position backward by a distance T as shown in FIG. 5 (e), and searches for an arrangement position again as shown in FIGS. 5 (b) and 5 (c).

FIG. 5 (f) shows a state in which there is an arrangement position of the piece of cargo 5 to be searched for when the search start position is shifted backward for example multiple times by the distance T and its sum total becomes a distance T1.

When, as a result of searching for the arrangement position of the piece of cargo 5 to be searched for, it is determined that there is an arrangement position, the calculation section 128 determines the position as an arrangement position of the piece of cargo 5 to be searched for, and stores the position in association with the piece of cargo 5 in the storage section 121.

The calculation section 128 may use any one of two such search methods as described above according to the piece of cargo 5.

In addition, the calculation section 128 sets a plurality of reference lines L each parallel with the width direction and defining a tip of a piece of cargo 5. Herein, a reference line L set at a front end of the accommodating portion 6 is referred to as a first reference line L1, and a reference line set behind the first reference line L1 is referred to as a second reference line L2.

As shown in FIG. 6, the first reference line L1 defines a front end of a piece of cargo 5 among pieces of cargo 5 accommodated in the accommodating portion 6 that is closest to the front surface 6b. The first reference line L1 defines a front end of a piece of cargo 5 arranged at the front end of the accommodating portion 6 in the example of the present embodiment. Herein, to define a front end of a piece of cargo 5 means that a position of the front end of the piece of cargo 5 overlaps the reference line L, or that the position of the front end of the piece of cargo 5 is arranged at a position separated from the reference line L by a predetermined distance.

The second reference line L2 defines a front end of a piece of cargo 5 whose arrangement position has been determined at a position exceeding the threshold value TH behind the reference line L and whose position is closest to the reference line L.

Further, when a total amount of shifting the search start position of the piece of cargo 5 backward relative to the reference line L exceeds the threshold value TH, the calculation section 128 performs searching for an arrangement position of (pieces of) cargo 5 to be stacked on the piece of cargo 5 whose arrangement position has already been determined up to a predetermined height. The calculation section 128, for example, determines, as an arrangement position of a piece of cargo 5 in a second layer and above, a position at which a center thereof is aligned with a center of a piece of cargo 5 of a first layer in the vertical direction. The calculation section 128 stores the determined arrangement position in the storage section 121.

Herein, in the example of the present embodiment, a predetermined height position is a height position at which a piece of cargo 5 does not interfere with the ceiling surface 6c, a piece of cargo 5 of the uppermost layer is close to the ceiling surface 6c, and the device main body 20 does not interfere with the ceiling surface 6c during a loading operation of a piece of cargo 5 by the device main body 20. In addition, the calculation section 128 determines the number of pieces of cargo 5 when the piece of cargo 5 of the uppermost layer reaches the predetermined height. The calculation section 128 stores the determined number in the storage section 121.

In addition, after determining the arrangement position of the piece of cargo 5 to be stacked on the piece of cargo 5 of the first layer, the calculation section 128 searches again for an arrangement position of a piece of cargo 5 further behind on the floor surface 6a.

Further, the calculation section 128 determines a moving distance of the traveling device 30 of the device main body 20 when arranging the piece of cargo 5 in the accommodating portion 6 by the device main body 20. Herein, the moving distance is a moving distance from a position at which the piece of cargo 5 can be arranged in an area between two reference lines L aligned in the front-back direction to a position at which the piece of cargo 5 can be arranged in an area which is between two reference lines L aligned in the front-back direction and adjacent the aforementioned area at the rear. For example, regarding the moving distance, "between two reference lines L aligned in the front-back direction" means between the above-described reference line L1 and reference line L2.

In the example of the present embodiment, the calculation section 128 determines a distance between two reference lines L aligned in the front-back direction as a moving distance of the traveling device 30. The calculation section 128 stores the determined moving distance in the storage section 121.

The drive section 129 controls electric power to be supplied to the device main body 20 for arranging, by the device main body 20, a piece of cargo 5 at an arrangement position of the piece of cargo 5 stored in the storage section 121.

Next, an example of a determination method of an arrangement position of a piece of cargo 5 by the control device 120 will be described using FIG. 7. In this example, dimensions of a plurality of pieces of cargo 5 to be sent from the external conveying part 130 to the device main body 20 are equal.

The calculation section 128 first sets a search start position at the front end of the floor surface 6a of the accommodating portion 6 (step ST1).

Next, the calculation section 128 sets the first reference line L1. The first reference line L1 defines a front end of a piece of cargo 5 arranged at the search start position. The calculation section 128 sets the first reference line L1 at the front end of the floor surface 6*a* (step ST2).

Next, the calculation section 128 searches for an arrangement position of the piece of cargo 5 in the width direction (step ST3). Next, the calculation section 128 determines whether or not there is an arrangement position (step ST4). If there is an arrangement position of the piece of cargo 5 (YES in step ST4), the calculation section 128 determines the position as an arrangement position of the piece of cargo 5 and stores it in the storage section 121 (step ST5). Next, the calculation section 128 returns to step ST3.

If there is no arrangement position of the piece of cargo 5 (NO in step ST4), the calculation section 128 shifts the search start position backward by a distance T (step ST5).

Next, the calculation section 128 determines whether or not a total amount of shifting the search start position backward relative to the first reference line L1 exceeds the threshold value TH (step ST7). Until the total amount exceeds the threshold value TH (YES in step ST7), the calculation section 128 repeats the operations of step ST3 to step ST6.

If the total amount of shifting the search start position backward relative to the first reference line L1 exceeds the threshold value TH (YES in step ST7), the calculation section 128 switches to searching for an arrangement position of a piece of cargo 5 to be stacked on the piece of cargo 5 whose arrangement position has been determined up to a predetermined height position. In other words, the calculation section 128 switches to searching for an arrangement position of a piece of cargo 5 in the second layer and above (step ST8).

The calculation section 128, for example, determines, as an arrangement position of the piece of cargo 5 in the second layer and above, a position at which a center thereof is aligned with a center of the piece of cargo 5 of the first layer. In addition, the calculation section 128 determines the number of pieces of cargo 5 to be stacked according to the predetermined height.

Next, upon determining the arrangement position of the piece of cargo 5 in the second layer and above, the calculation section 128 searches for an arrangement position of a piece of cargo 5 further behind on the floor surface 6*a*. Specifically, the same operations as those in steps ST3 to ST6 are performed. Then, the calculation section 128 sets a second reference line L2 defining a front end of a piece of cargo 5 whose arrangement position is determined first (step ST9). In other words, the calculation section 128 sets a second reference line L2 defining a front end of a piece of cargo 5 closest to the previously set reference line L among pieces of cargo 5 whose determined arrangement positions exceed the threshold value TH with respect to the previously set reference line L.

When the second reference line L2 is set, the calculation section 128 calculates a distance between reference lines L aligned in the front-back direction, and stores the distance in the storage section 121 as a traveling distance of the device main body 20 by the traveling device 30 (step ST10).

Next, if there is a piece of cargo 5 whose arrangement position is not determined (YES in step ST11), the calculation section 128 returns to step ST3.

If there is no piece of cargo 5 whose arrangement position is not determined (NO in step ST11), the calculation section 128 ends the operation of determining the arrangement position of the piece of cargo 5. Thereby, arrangement positions are determined for all of the pieces of cargo 5 as shown in FIG. 9.

Next, an example of an operation of arranging a piece of cargo 5 in the accommodating portion 6 by the device main body 20 will be described.

As shown in FIG. 8, the drive section 129 reads out information of an arrangement position of a piece of cargo 5 and information of a traveling distance by the traveling device 30 within the accommodating portion 6, stored in the storage section 121 (step ST21).

Next, the drive section 129 drives the traveling device 30 to move the device main body 20 to a position to arrange the piece of cargo 5 in the accommodating portion 6. At this time, the drive section 129 aligns the first direction X, the second direction Y, and the third direction Z of the device main body 20 with the front-back direction, the width direction, and the vertical direction of the accommodating portion 6.

Next, the drive section 129 controls the holding part 40, the conveying part 50, and the holding part moving device 60 to arrange, on the floor surface 6*a*, the piece of cargo 5 whose arrangement position has been determined, between the two reference lines L aligned in the front-back direction of the floor surface 6*a* (step ST22).

Next, the drive section 129 controls the holding part moving device 60 or the supporting part moving device 80 to arrange a piece of cargo 5 in the second layer and above on the piece of cargo 5 arranged on the first layer (step ST23).

Then, the drive section 129 determines whether or not there is a piece of unarranged cargo (step ST24). If there is a piece of unarranged cargo 5 (YES in step ST24), the drive section 129 controls the traveling device 30 to move the device main body 20 backward by amount traveled by the traveling device 30, which was read out in step ST11 (step ST25), and returns to step ST22.

Until arrangement of all of the pieces of cargo 5 is completed (YES in step ST24), the drive section 129 repeats steps ST22 to ST25.

If the arrangement of all of the pieces of cargo 5 is completed (NO in step ST24), the drive section 129 completes the arrangement task of the pieces of cargo 5.

In the cargo handling device 10 with the above-described configuration, the calculation section 128 searches for an arrangement position of a piece of cargo 5 based on information of dimensions of the accommodating portion 6 and information of dimensions of the piece of cargo 5, stored in the storage section 121. Specifically, the calculation section 128 searches for an arrangement position of a piece of cargo 5 in the width direction, and when there is a position at which the piece of cargo 5 does not interfere with a boundary of the accommodating portion 6 and other pieces of cargo 5, determines that position as the arrangement position of the piece of cargo 5. Then, if the searching discovers no position at which the piece of cargo 5 does not interfere with a boundary of the accommodating portion 6 and other pieces of cargo 5 in the width direction, the calculation section 128 searches for an arrangement position of the piece of cargo 5 again at a position shifted backward by a distance T.

Thus, even in a case where a piece of cargo 5 is not rectangular, it is possible to search for an arrangement position of the piece of cargo 5 based on dimensions of the piece of cargo 5. Then, a position in contact with other adjacent objects or a position at which a gap with other adjacent objects is small becomes an arrangement position.

Thus, even in a case where a piece of cargo 5 is not rectangular, arrangement efficiency of the piece of cargo 5 with respect to the accommodating portion 6 can be improved.

Furthermore, by setting a reference line L, it is possible to switch from searching the floor surface 6a for an arrangement position of a piece of cargo 5 to searching for an arrangement position of a piece of cargo 5 to be stacked in the vertical direction, and to determine a moving distance of the device main body 20 in the accommodating portion 6.

Furthermore, switching to searching for an arrangement position of a piece of cargo 5 in the second layer and above when a total amount of shifting a search start position backward relative to the reference line L exceeds the threshold value TH makes it possible to fully utilize a moving range of the piece of cargo 5 by the holding part moving device 60 of the device main body 20. Therefore, it is possible to reduce the number of times of switching between traveling and stopping in the accommodating portion 6 of the device main body 20. Thus, it is possible to improve efficiency of the arrangement task of the pieces of cargo 5.

Furthermore, by determining a distance between reference lines L adjacent in the front-back direction as a traveling distance in the accommodating portion 6 of the device main body 20, it is possible to minimize a traveling amount of the device main body 20 by the traveling device 30 in the accommodating portion 6 while fully utilizing a movable range of a piece of cargo 5 by the holding part moving device 60. Therefore, it is possible to improve the efficiency of the arrangement task of the pieces of cargo 5.

According to this embodiment, even if an object is other than a rectangular parallelepiped, the efficiency of arrangement in the accommodating portion 6 can be improved.

Note that, in the above-described example, a configuration in which the storage section 121 stores actual dimensions of a piece of cargo 5 has been described as an example, but the configuration is not limited thereto. In another example, as dimensions of a piece of cargo 5 to be stored in the storage section 121, dimensions larger than actual ones may be stored. By setting dimensions of a piece of cargo 5 to be stored in the storage section 121 to be larger than the actual dimensions, it is possible to absorb a position shift of the piece of cargo 5 in the accommodating portion 6. Considering an expected shift amount, dimensions to be stored in the storage section 121 may be determined to be a value that can absorb this shift.

In addition, in the above-described example, an example has been described in which the cargo handling device 10 is formed to be capable of loading and unloading as an example, but the present invention is not limited thereto. In another example, the cargo handling device 10 may perform only loading.

In the above-described example, an example has been described in which arrangement positions of all of the pieces of cargo 5 are determined and stored in the storage section 121 before arranging the pieces of cargo 5 in the accommodating portion 6, and the pieces of cargo 5 are arranged in the accommodating portion 6 based on the arrangement positions stored in the storage section 121, as an example, but the present invention is not limited thereto. In another example, planning of an arrangement position of a piece of cargo 5 by the control device 120 and an operation of arranging the piece of cargo 5 in the accommodating portion 6 by the device main body 20 may be performed in parallel.

In addition, in the above-described example, an example of arranging a piece of cargo 5 in the second layer and above has been described, but the present invention is not limited thereto. In another example, planning of an arrangement position to arrange only one layer of a piece of cargo 5 on the floor surface 6a may be performed without searching for an arrangement position in which to stack a piece of cargo 5. For example, in a case where the cargo handling device 10 performs an unloading task, an unloaded piece of cargo 5 may be, for example, aligned one layer in a planar arrangement area without conveying the unloaded piece of cargo 5 to the conveying part 50.

Note that, in the above-described example, the control device 120 performs determination of an arrangement position of a cylindrical piece of cargo 5, but the present invention is not limited thereto. For example, the piece of cargo 5 may have a shape with polygonal end faces as another example. In this example, the shape may be a triangular prism, a rectangular parallelepiped, or a hexagonal prism.

For example, in a case where the shape of a piece of cargo 5 is a shape other than a cylindrical or columnar shape, information of the piece of cargo 5 may include information of a posture of the piece of cargo 5 when being arranged in the accommodating portion 6. From the posture of the piece of cargo 5 when being arranged in the accommodating portion 6, it is possible to calculate a distance between a center of a piece of cargo 5 to be searched for and a boundary of the accommodating portion 6, and a distance between the center of the piece of cargo 5 to be searched for and a center of a piece of cargo 5 whose arrangement position has already been determined.

In the above-described example, an example has been described in which dimensions of a plurality of pieces of cargo 5 to be sent from the external conveying part 130 to the device main body 20 are equal, but the present invention is not limited thereto. In another example, a radius of a piece of cargo 5 to be sent to the device main body 20 later may be smaller than that of a previously sent object. In other words, pieces of cargo 5 may be sent to the device main body 20 in descending order of size. Even in this case, as an arrangement position of a piece of cargo 5 to be stacked in the second layer and above, a central position thereof can be aligned with that of an arrangement position of a piece of cargo 5 on the first layer.

In a case where a radius of the piece of cargo 5 to be stacked in the second layer and above is larger than that of a piece of cargo 5 arranged on a lower layer, searching for an arrangement position of the piece of cargo 5 to be stacked thereafter may be canceled. Alternatively, if a radius of a piece of cargo 5 of an upper layer is larger than that of a piece of cargo 5 of a lower layer, an arrangement position of the piece of cargo 5 of the lower layer may be corrected so that the piece of cargo 5 of the upper layer can be stably arranged on the piece of cargo 5 of the lower layer. In addition, along with this correction, an arrangement position of a surrounding piece of cargo 5 may be corrected.

In a case where dimensions of pieces of cargo 5 to be sent from the external conveying part 130 to the device main body 20 are different, pieces of cargo 5 of the same dimensions may be grouped, and the pieces of cargo 5 may be sent from the external conveying part 130 to the device main body 20 in groups. As such, pieces of cargo of the same dimensions are continuously sent so that an arrangement position of a piece of cargo 5 to be stacked in the second layer and above can be easily determined.

Note that, in the above-described example, an example has been described in which a position of a search start position in the width direction is constant as an example, but the present invention is not limited thereto. In another example, each time a piece of cargo 5 to be searched for changes, a search start position may be changed in the width direction. As a specific example, a position in the width direction of a search start position of a previous piece of cargo 5 to be searched for may be set to be a position adjacent to one side surface 6*d*, and a position in the width direction of a search start position of a next piece of cargo 5 to be searched for may be set to be a position adjacent to the other side surface 6*d*.

Next, a cargo handling device 10 according to a second embodiment will be described using FIG. 10. Components having the same functions as those of the first embodiment are denoted by the same reference signs as those of the first embodiment, and descriptions thereof will be omitted. The present embodiment is different from the first embodiment in that an arrangement position of a piece of cargo 5 is corrected at a planning stage.

In the example of the present embodiment, at least one of an arrangement position of a piece of cargo 5 and the number of pieces of cargo 5 to be stacked in the vertical direction is corrected.

Figure 10:
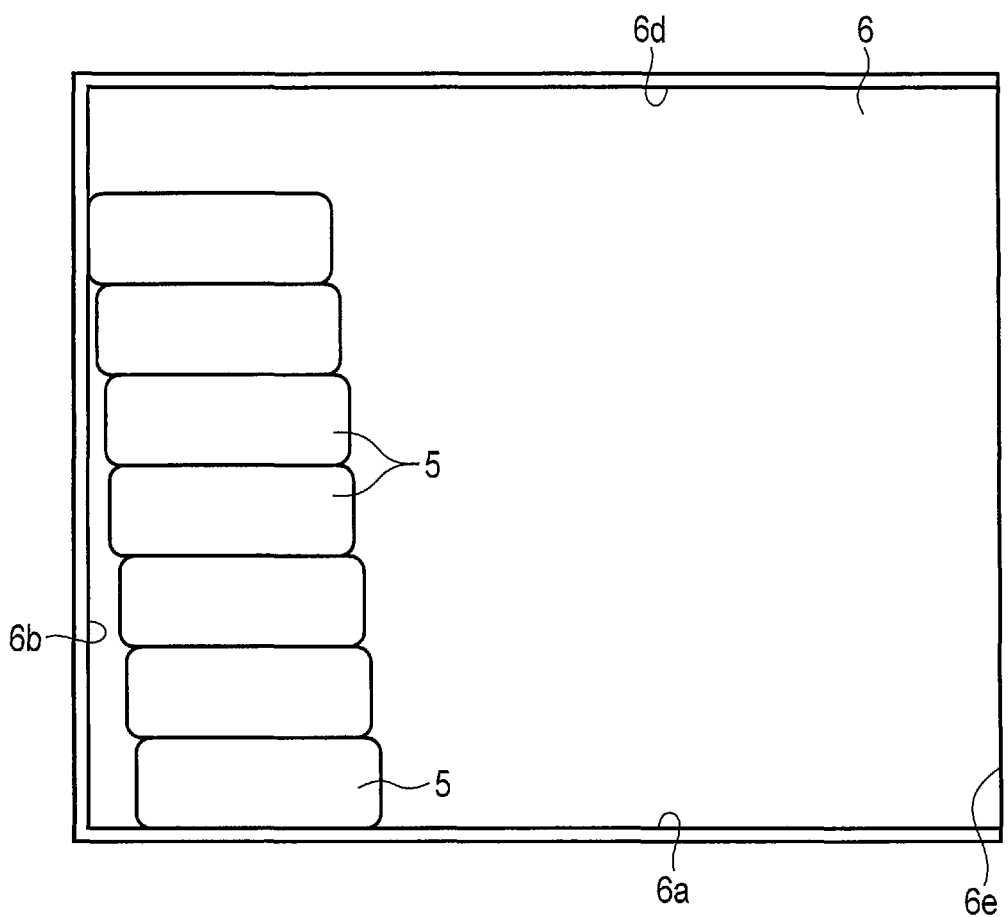
FIG. 10 is a diagram explaining correction of an arrangement position by a control device of a cargo handling device according to a second embodiment.

As shown in FIG. 10, in the example of the present embodiment, the calculation section 128 performs correction of an arrangement position of a piece of cargo 5. For example, after arrangement positions of all pieces of cargo 5 are determined, the calculation section 128 performs correction of the arrangement positions. The calculation section 128, for example, performs correction for a piece of cargo 5 of the first layer such that at least a piece of cargo 5 of the uppermost layer is arranged on a side of the front surface 6*b*, which is a part of a wall facing the opening portion 6*e*. The calculation section 128, for example, performs correction to shift the arrangement position such that a center of gravity of one piece of cargo 5 from the first layer to the uppermost layer is closer to the front surface 6*b*. As shown in FIG. 10, for example, the calculation section 128 may perform correction of the arrangement position by shifting the position of the piece of cargo 5 of the first layer to a direction away from the front surface 6*b* so that the piece of cargo 5 in the second layer and above is arranged on the front surface 6*b* side with respect to the piece of cargo 5 of the lower layer. Note that when performing correction so that at least a piece of cargo 5 of the uppermost layer is arranged on the front surface 6*b* side with respect to a piece of cargo 5 of the first layer, there may be a case in which correction of an arrangement position is unnecessary for some pieces of cargo among a plurality of pieces of cargo 5 from the first layer to the upper end.

An amount to shift the piece of cargo 5 of the first layer may be stored in the storage section 121 as a predetermined value. As another example, a coefficient for determining an amount to shift the piece of cargo 5 of the first layer may be stored in the storage section 121, and a shift amount may be determined from a product of this coefficient and dimensions of the piece of cargo 5 of the first layer in the second direction. In addition, a shift amount of the piece of cargo 5 in the second layer and above may be stored in the storage section 121 as a predetermined value. Alternatively, the shift amount of the piece of cargo 5 in the second layer and above may be appropriately determined by calculation according to the shift amount of the arrangement position of the piece of cargo 5 of the first layer and the number of pieces of cargo 5 to be stacked.

As such, at least an arrangement position of a piece of cargo 5 of the uppermost layer is present on the front surface 6*b* side with respect to the piece of cargo 5 of the first layer so that collapsing of the pieces of cargo 5 can be suppressed. Note that in FIG. 10, the pieces of cargo 5 opposing the front surface 6*b* have been described, but for example, an arrangement position may be corrected in the same manner also for a piece of cargo 5 arranged at a position away from the front surface 6*b* to the rear.

In the example shown in FIG. 10, the arrangement positions are corrected so that each of the pieces of cargo 5 from the second layer to the uppermost layer is arranged on the front surface 6*b* side with respect to the piece of cargo 5 in the lower layer, but the corrected arrangement positions of the pieces of cargo 5 are not limited thereto. In another example, a central position of a piece of cargo 5 in a predetermined layer and above, e.g., in the second layer and above, may be aligned in the vertical direction.

In addition, an example of correcting the number of pieces of cargo 5 to be stacked will be described using FIG. 11. For example, in this example, the calculation section 128 corrects the number of pieces of cargo 5 to be stacked so as to make a height position of a piece of cargo 5 of the uppermost layer lower on the opening portion 6*e* side than on the front surface 6*b* side.

Figure 11:
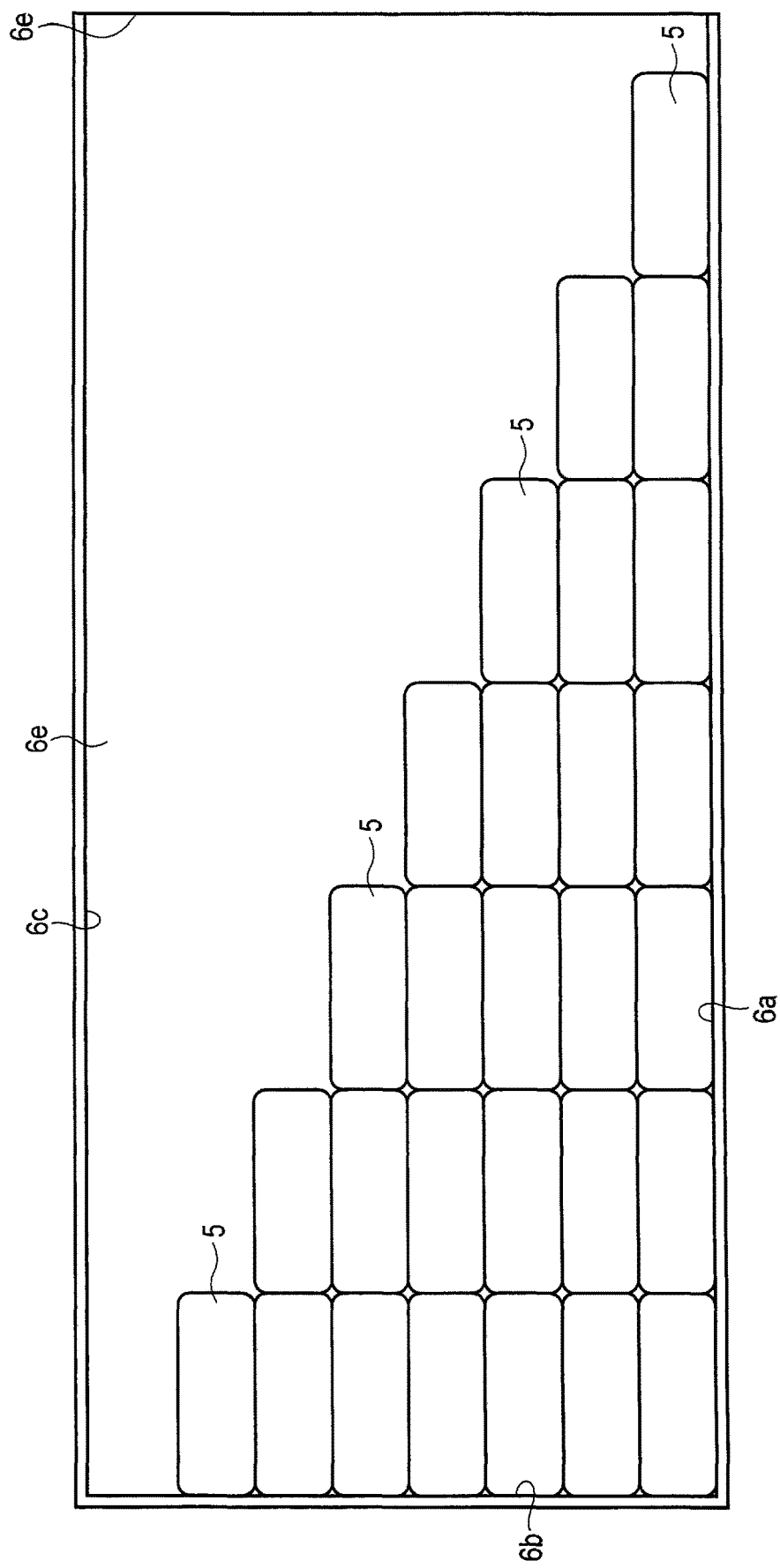
FIG. 11 is a diagram explaining correction of the number of object(s) to be stacked by the control device.

For example, as shown in FIG. 11, depending on an empty space of the accommodating portion 6, it is possible to change the number of pieces of cargo 5 to be stacked while maintaining the number of pieces of cargo 5 to be accommodated in the accommodating portion 6. In such a case, the calculation section 128 may correct the number of pieces of cargo 5 to be stacked so that a height position of a piece of cargo 5 of the uppermost layer becomes higher toward the front surface 6*b* side by adjusting the number of pieces of cargo 5 to be arranged on the opening portion 6*e* side. Alternatively, the height position of the piece of cargo 5 of the uppermost layer on the opening portion 6*e* side may be made lower than that on the front surface 6*b* side by reducing the number of pieces of cargo 5 to be accommodated in the accommodating portion 6.

As such, a height position of a piece of cargo 5 of the uppermost layer on the opening portion 6*e* side is lower than a height position of a piece of cargo 5 of the uppermost layer on the front surface 6*b* side so that cargo collapsing can be prevented.

Next, a cargo handling device 10 according to a third embodiment will be described. Components having the same functions as those of the first embodiment are denoted by the same reference signs as those of the first embodiment, and descriptions thereof will be omitted.

The present embodiment is different from the first embodiment in that in a case where a position of a piece of cargo 5 in the accommodating portion 6 is shifted from a preplanned arrangement position, this shift is detected by a sensor, etc. so as to correct an arrangement position of an unarranged piece of cargo 5.

For example, the calculation section 128 can use the detection part 90 and the height detection part 91 as examples of the sensor. For example, in a case where a result of detection by the height detection part 91 is different from a height position based on a preplanned arrangement position of a piece of cargo 5, the calculation section 128 corrects an arrangement position in the vertical direction of an unarranged piece of cargo 5 to be stacked in an upper layer of that piece of cargo 5. For example, there may be a case in which a height dimension of a piece of cargo 5 in the vertical direction changes due to a weight of the piece of cargo 5 and a height position of an arranged piece of cargo 5 differs from an arrangement position determined in advance.

Alternatively, for example, even in a case where a height dimension of a piece of cargo 5 is different from a height dimension stored in the storage section 121, it is possible to correct an arrangement position of a piece of cargo 5 to be arranged in an upper layer of this piece of cargo 5.

In addition, as a modification of correction for correcting an arrangement position of an unarranged piece of cargo 5 based on a position of a piece of cargo 5 arranged in the accommodating portion 6, the detection part 90 may be used. By capturing the piece of cargo 5 arranged in the accommodation part 6 by the detection part 90, it is possible to detect a shift in at least one of the width direction and the front-back direction of the piece of cargo 5 and correct an arrangement position of the unarranged piece of cargo 5.

In the above-described example, an example has been described in which a position of an arranged piece of cargo 5 is detected by a sensor and an arrangement position of an unarranged piece of cargo 5 is corrected based on a detected value, but the present invention is not limited thereto. In another example, for example, a position of a piece of cargo 5 arranged in the accommodating portion 6 may be moved by the device main body 20 so as to shift an arrangement position.

In addition, two or more of these first to third embodiments may be combined.

According to at least one of the embodiments described above, even if an object is other than a rectangle, arrangement efficiency of such an object in the accommodating portion 6 can be improved.

In the present embodiment, it is also possible to discretionarily set a predetermined area instead of an existing tangible accommodating portion (e.g., warehouse, container) and arrange an object other than a rectangle in the area. In a two-dimensional shape area, it is possible to set a predetermined area as a rectangular plane by defining dimensions in X and Y axis directions, and arrange an object other than a rectangle in the area. Further, in a three-dimensional shape area, it is possible to set a predetermined area as a rectangular space by, for example, defining dimensions in X, Y, and Z axis directions, and arrange an object other than a rectangle in the space.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arrangement position determination method of an object, comprising:
    based on information of dimensions of a predetermined area and dimensions of a plurality of objects to be accommodated in the predetermined area stored in a storage section of a control device, searching for a position at which the object does not interfere with a boundary of the predetermined area and other objects in a first direction; and
    when there is no position at which the object does not interfere with the boundary and the other objects in the first direction, searching for a position at which the object does not interfere with the boundary and the other objects in the first direction at a position shifted in a second direction orthogonal to the first direction.

2. An arrangement position determination method of an object, comprising:
    based on information of dimensions of an accommodating portion and dimensions of a plurality of objects to be accommodated in the accommodating portion stored in a storage section of a control device, searching for a position at which the object does not interfere with a boundary of the accommodating portion and other objects in a first direction; and
    when there is no position at which the object does not interfere with the boundary and the other objects in the first direction, searching for a position at which the object does not interfere with the boundary and the other objects in the first direction at a position shifted in a second direction orthogonal to the first direction.

3. The arrangement position determination method of an object according to claim 2, further comprising:
    setting a plurality of reference lines each parallel with the first direction and defining a tip of the object,
    wherein a reference line set at one end of the accommodating portion in the second direction defines the tip of the object arranged on the one end side, and
    another reference line defines the tip of the object whose arrangement position exceeds a maximum moving distance of the object along the second direction by a device included in a cargo handling device configured to arrange the object in the accommodating portion with respect to the reference line adjacent on the one end side and which is close to the reference line adjacent on the one end side.

4. The arrangement position determination method of an object according to claim 3, further comprising calculating a distance between two reference lines adjacent in the second direction to determine the distance as a moving distance of the cargo handling device.

5. The arrangement position determination method of an object according to claim 3, wherein
    the accommodating portion includes an opening portion through which the cargo handling device passes and a wall portion facing the opening portion, and
    a number of the objects to be stacked is reduced on the opening portion side as compared with the wall portion side.

6. The arrangement position determination method of an object according to claim 3, further comprising:
    when a total amount of shifting the search position from the reference line exceeds the maximum moving distance, searching for an arrangement position of the object to be stacked up to a predetermined height position with respect to the object whose arrangement position is determined; and
    when the arrangement position of the object to be stacked is determined, searching for a position at which the object does not interfere with the boundary and the other objects in the first direction.

7. The arrangement position determination method of an object according to claim 6, wherein
    the accommodating portion includes an opening portion through which the cargo handling device passes and a wall portion facing the opening portion, and
    the method further comprises performing correction for shifting an arrangement position of the object of a first layer to the opening portion side and arranging at least the object of an uppermost layer on the wall portion side as compared with the object of the first layer.

8. A control device comprising:
    a storage section configured to store information of dimensions of an accommodating portion and dimensions of a plurality of objects to be accommodated in the accommodating portion; and a calculation section configured to search for a position at which an object does not interfere with a boundary of the accommodating portion and other objects in a first direction based on the information of the dimensions of the accommodating portion and the dimensions of the objects stored in the storage section, and when there is no position at which the object does not interfere with the boundary and the other objects in the first direction, to search for a position at which the object does not interfere with the boundary and the other objects in the first direction at a position shifted in a second direction orthogonal to the first direction.

9. The control device according to claim 8, wherein the calculation section is configured to set a plurality of reference lines each parallel with the first direction and defining a tip of the object, the reference line set at one end of the accommodating portion in the second direction defines the tip of the object arranged on the one end side, and another reference line defines the tip of the object whose arrangement position exceeds a maximum moving distance of the object along the second direction by a device included in a cargo handling device configured to arrange the object in the accommodating portion with respect to the reference line adjacent on the one end side and which is close to the reference line adjacent on the one end side.

10. The control device according to claim 9, wherein the calculation section is configured to:

search for, when a total amount of shifting the search position from the reference line exceeds the maximum moving distance, an arrangement position of the object to be stacked up to a predetermined height position with respect to the object whose arrangement position is determined; and search for, when the arrangement position of the object to be stacked is determined, a position at which the object does not interfere with the boundary and the other objects in the first direction.

11. The control device according to claim 9, wherein the calculation section is configured to calculate a distance between two reference lines adjacent in the second direction to determine the distance as a moving distance of the cargo handling device.

12. The control device according to claim 9, wherein the accommodating portion includes an opening portion through which the cargo handling device passes and a wall portion facing the opening portion, and the calculation section is configured to perform correction for shifting an arrangement position of the object of a first layer toward the opening portion side and arrange at least the object of an uppermost layer on the wall portion side as compared with the object of the first layer.

13. The control device according to claim 9, wherein the accommodating portion includes an opening portion through which the cargo handling device passes and a wall portion facing the opening portion, and the calculation section is configured to reduce a number of the objects to be stacked on the opening portion side as compared with the wall portion side.

14. A non-transitory computer-readable storage medium storing a program that causes a computer to execute:

a function of searching for, based on information of dimensions of an accommodating portion and dimensions of a plurality of objects to be accommodated in the accommodating portion stored in a storage section of a control device, a position at which the object does not interfere with a boundary of the accommodating portion and other objects in a first direction; and a function of searching for, when there is no position at which the object does not interfere with the boundary and the other objects in the first direction, a position at which the object does not interfere with the boundary and the other objects in the first direction at a position shifted in a second direction orthogonal to the first direction.

15. The non-transitory computer-readable storage medium storing a program according to claim 14, wherein the program further causes the computer to execute a function of setting a plurality of reference lines each parallel with the first direction and defining a tip of the object, wherein a reference line set at one end of the accommodating portion in the second direction defines the tip of the object arranged on the one end side, and another reference line defines the tip of the object whose arrangement position exceeds a maximum moving distance of the object along the second direction by a device included in a cargo handling device configured to arrange the object in the accommodating portion with respect to the reference line adjacent on the one end side and which is close to the reference line adjacent on the one end side.

16. The non-transitory computer-readable storage medium storing a program according to claim 15, wherein the program further causes the computer to execute:

a function of calculating a distance between two reference lines adjacent in the second direction to determine the distance as a moving distance of the cargo handling device.

17. The non-transitory computer-readable storage medium storing a program according to claim 15, wherein the program further causes the computer to:

reduce a number of the objects to be stacked on an opening portion side of the accommodating portion as compared with a wall portion side facing the opening portion of the accommodating portion.

18. The non-transitory computer-readable storage medium storing a program according to claim 15, wherein the program further causes the computer to execute:

a function of searching for an arrangement position of the object to be stacked up to a predetermined height position with respect to the object whose arrangement position is determined when a total amount of shifting the search position from the reference line exceeds the maximum moving distance; and a function of searching for a position at which the object does not interfere with the boundary and the other objects in the first direction when the arrangement position of the object to be stacked is determined.

19. The non-transitory computer-readable storage medium storing a program according to claim 18, wherein the program further causes the computer to execute:

a function of performing correction for shifting an arrangement position of the object of a first layer toward an opening portion side of the accommodating portion to arrange at least the object of an uppermost layer on a wall portion side facing the opening portion of the accommodating portion as compared with the object of the first layer.

20. A cargo handling device comprising:
a holding part configured to hold an object;
a device configured to move the holding part;
a traveling device configured to support the holding part and the device and travel; and
a control device that includes
- a memory configured to store information of dimensions of an accommodating portion and dimensions of a plurality of objects to be accommodated in the accommodating portion, and
- circuitry configured to search for a position at which an object does not interfere with a boundary of the accommodating portion and other objects in a first direction based on the information of the dimensions of the accommodating portion and the dimensions of the objects stored in the memory, and when there is no position at which the object does not interfere with the boundary and the other objects in the first direction, to search for a position at which the object does not interfere with the boundary and the other objects in the first direction at a position shifted in a second direction orthogonal to the first direction.

* * * * *